2,887,396

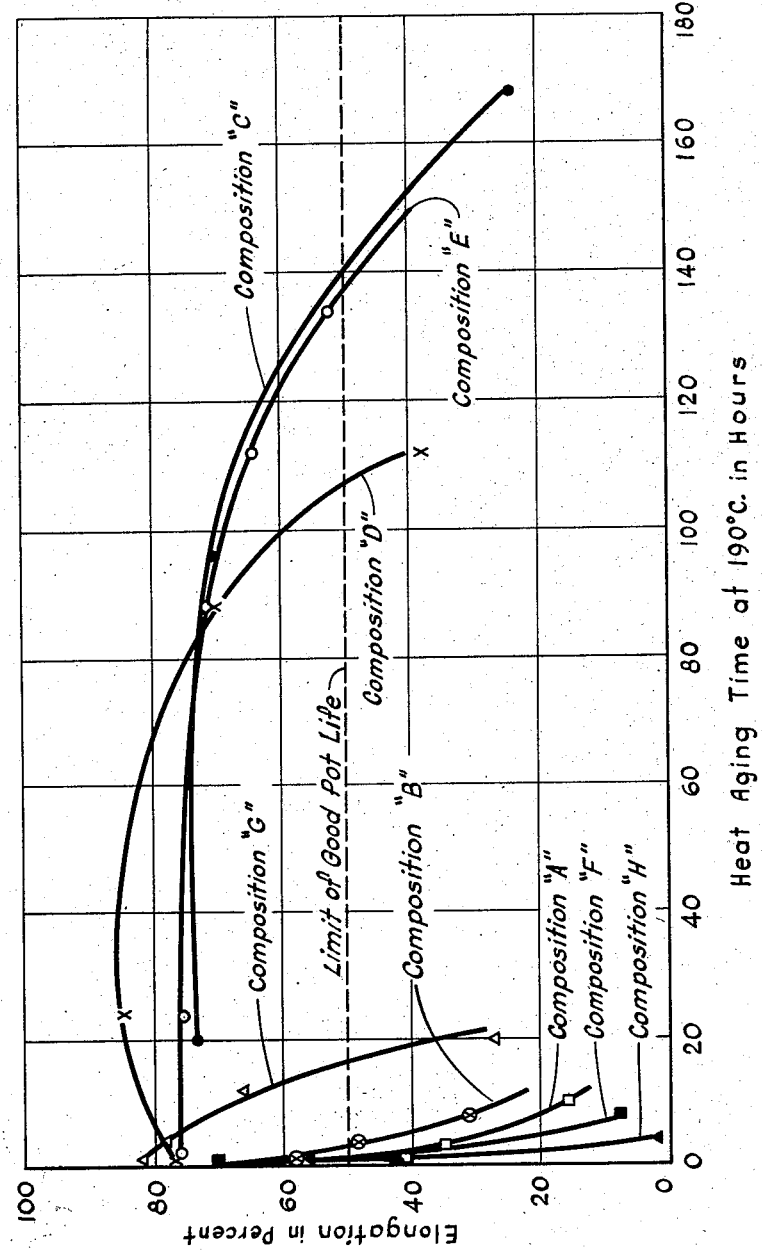

STABILIZED ETHYL CELLULOSE HOT MELT COMPOSITIONS

Richard M. Krajewski and Harold C. Kelly, Midland, Mich., assignors to The Dow Chemical Company, Midland, Mich., a corporation of Delaware Application July 30, 1957, Serial No. 675,135

19 Claims. (Cl. 106—177)

This invention relates to stabilized ethyl cellulose-containing compositions that are particularly adapted to be utilized as hot melts in order to be applied to desired articles, such as metal parts and the like, to form tough, protective coatings that can be easily stripped or peeled clean from the coated articles to ready them for use. The present application is a continuation-in-part of the copending application for United States Letters Patent having Serial Number 627,124, now abandoned, which was filed on December 10, 1956.

Ethyl cellulose has been employed extensively and with significant advantage in various hot melt compositions in order to impart toughness and flexibility to the resulting coatings that are obtainable therewith. While the formulations of such compositions may be widely varied to meet particular requirements, they may typically contain between about 20 and 30 percent by weight of the cellulose ether (or more or less in specific instances) in combination with various resins, mineral oils, waxes, plasticizers and the like that are conventional for such formulations. In addition to their uses for the readily removable and usually more or less temporary protective coating of metal parts and the like, such compositions have found widespread application in the paper coating and allied fields. In compositions that are adapted for paper coating and the like, it is not unusual to utilize as little as about 10 percent by weight of the cellulose ether. U.S. Patent No. 2,394,101; Canadian Patent No. 525,610 and British Patent No. 734,968 contain docent illustrations of various ethyl cellulose hot melt compositions.

The hot melt compositions of ethyl cellulose are generally applied, as in hot dip procedures, at elevated temperatures which may range, for example, from about 140° to 190° C. When metal articles are being coated it is common to utilize the upper portion of the indicated range, say from about 175° to 190° C. And, in many instances, especially when metal articles are being hot dipped, it is not uncommon for the hot melt composition to be necessarily and unavoidably maintained at elevated temperatures for considerably prolonged periods of time. This, of course, may lead to degradation of the hot melt composition, as may be evidenced by its loss in viscosity and readily apparent thinning out to an undesirable degree after excessive thermal exposures. Oftentimes, under such conditions, the point is quickly reached where suitably thick coatings cannot be obtained with the composition. Extended thermal exposures may also cause discoloration of the hot melt composition to an intolerable degree.

It is conventional practice to stabilize ethyl cellulose hot melt compositions against thermal degradation by the incorporation therein of various antioxidant and other stabilizing additaments. For example, the type of degradation that is known as acid catalyzed hydrolytic degradation may be largely minimized or overcome by incorporating various acid accepting epoxy compounds in the ethyl cellulose composition. Likewise, oxidative degradation may be provided for and its effects substantially nullified by incorporating in the ethyl cellulose hot melt composition any one or more of a great number of oxidation inhibitors that are known to be effective for the purpose. Among the most utile and beneficial of the antioxidant materials that are available for employment in ethyl cellulose hot melt compositions is 2,2'-methylene-bis (4-methyl-6-tert.-butyl phenol). One commercial source of this material designates it to the trade as "Antioxidant 2246."

The utilization of 2,2'-methylene-bis (4-methyl-6-tert.-butyl phenol) in a conventional manner as an antioxidant in ethyl cellulose hot melt compositions provides efficient means for greatly extending the useful life of the compositions, even when they are being maintained under the most severe influence of elevated hot dipping temperatures. Unfortunately, however, despite its advantageous inhibiting efficacy and capability to restrain the composition from excessive thinning, 2,2'-methylene-bis (4-methyl-6-tert.-butyl phenol) is itself subject to the serious disadvantage and objectionable tendency of becoming highly discolored upon exposure for prolonged periods to heat at elevated temperatures. This, of course, limits the general utility of the material for employment as an antioxidant in ethyl cellulose hot melt compositions that are intended to provide relatively clear and transparent coatings. And, as can be appreciated, many of the most desirable applications for ethyl cellulose hot melt coatings are based upon an achievement of relative transparency and substantial freedom from discoloration in the coating. This is not only for aesthetic reasons, as important as they may be, but due to the fact that many articles, such as metal parts and the like, bear legends and other identifying marks (such as numbers) on their surfaces which, as a practical matter, are very much desired to remain legibly discernible through whatever temporary protective coating may be applied thereover.

Therefore, it would be a great advantage to provide stabilized ethyl cellulose hot melt coating compositions that could employ 2,2'-methylene-bis (4-methyl-6-tert.-butyl phenol) as an antioxidant ingredient without being susceptible to becoming intolerably discolored upon prolonged exposure of the composition to heat at elevated hot dipping temperatures.

This desideration and other advantages and benefits may be realized in accordance with the practice of the present invention which provides ethyl cellulose-containing hot melt coating compositions that are formulated with the usual resinous, oleaginous, plasticizing, and other beneficial composition-modifying ingredients and which contain, as stabilizing ingredients therefor, a combination of minor proportions each of (A) 2,2'-methylene-bis (4-methyl-6-tert.-butyl phenol); (B) an acid-accepting epoxy compound; and (C) a neutral (or substantially neutral) organic phosphite compound that is selected from the group consisting of alkyl phosphites, halogen substituted alkyl phosphites, aryl phosphites, halogen substituted aryl phosphites, mixed alkylaryl phosphites, mixed halogen substituted alkyl-aryl phosphites and mixtures thereof. Advantageously, between 0.005 and 5 percent by weight of the 2,2'-methylene-bis(4-methyl-6-tert.-butyl phenol); between about 0.1 and 10 percent by weight of the acid-accepting epoxy compound; and between about 0.1 and 2.0 percent by weight of the neutral phosphite compound, each based on the weight of the composition, may be incorporated in the hot melt composition. More advantageously, amounts between about 0.05 and 4.0 percent by weight of the former antioxidant material; between about 2.0 and 8.0 percent by weight of the acid-accepting epoxy compound; and between about 0.1 and 0.5 percent by weight of the last-mentioned neutral organic phosphite compound may be employed. In many instances, it may be found desirable to utilize proportions by weight of the antioxidant; epoxy compound and phosphite that are in the weight ratio of 0.4–4:10–30:1, respectively (oftentimes in the neighborhood of a combined total of about 4 to 7 percent by weight of the composition), within the indicated ranges of each of the stabilizing ingredients, particularly when such ratio is about 1:20:1.

It is usually suitable in the practice of the invention to employ an organic phosphite compound of the type that has been referred to in which the alkyl and aryl groups that may be involved independently contain from 2 to 10 and from 6 to 16 carbon atoms, respectively, in their structures. Equivalent structural characteristics are also applicable to the alkyl and aryl groups in mixed alkyl-aryl phosphites. Tricresyl phosphite, 2-ethylhexyl octylphenyl phosphite, tris(2-chloroethyl) phosphite, tri-isooctyl phosphite, tris(2-ethylhexyl) phosphite, trihexyl phosphite, tri-1-naphthyl phosphite, tri-ortho-xenyl phosphite, triphenyl phosphite and tri-para-tertiarybutyldiphenyl phosphite are typical of the organic phosphite compounds that may be utilized satisfactorily. Additional suitable neutral phosphites may be similar to or identical with the other varieties of such compounds that have been illustrated in the disclosure of Canadian Patent No. 517,031.

Practically any of the acid-accepting epoxy compounds may be utilized in the stabilized hot melt compositions of the present invention provided they are compatible in and with the particular system being stabilized. As will be appreciated by those who are skilled in the art, the determination of the compatibility of a particular substance which may be contemplated and intended as an ingredient for a hot melt composition may be simply and readily arrived at by easily performed tests. A wide variety of suitable acid-accepting epoxy compounds are known to the art and are readily available for utilization in the practice of the present invention. Included especially in this category may be such acid-accepting epoxy compounds as diglycidyl ethers of various polyglycols, particularly those polyglycols that are derived from condensation of say 8 to 40 moles of ethylene oxide or the like per mole of polyglycol product; diglycidyl ethers of glycerol and the like; metallic epoxy compounds; (such as those conventionally utilized in and with vinyl chloride polymer compositions) epoxidized ether condensation products; diglycidyl ethers of bisphenol A (4,4'-dihydroxy diphenyl dimethyl methane); epoxidized unsaturated fatty acid esters, particularly 4 to 12 carbon atoms or so alkyl esters of 12 to 22 carbon atom fatty acids such as butyl epoxy stearate, octyl epoxy stearate and the like; and various epoxidized long chain fatty acid triglycerides and the like, such as the epoxidized vegetable and other unsaturated natural oils (which are sometimes referred to as being epoxidized natural glycerides of unsaturated fatty acids, which fatty acids generally contain between about 12 and 22 carbon atoms) that may be specifically typified and particularized by such compositions as epoxidized soya bean oil. Many of the acid-accepting epoxy compounds are available from various sources.

Compositions that are in accordance with the invention have excellent color stability and are usually capable of providing desirably clear and light colored coatings, even after prolonged exposure to the most rigorous of hot dipping temperature elevations. Their characteristics in this regard are pronouncedly and practically astoundingly superior to ethyl cellulose compositions that are identically formulated save for the organic phosphite compound additamant or the acid-accepting epoxy ingredient, or both. In addition, the incorporation of the neutral organic phosphite compound in the hot melt composition exerts an ancillary viscosity stabilizing effect that augments the marked benefit that is obtainable in this regard with the combination of 2,2'-methylene-bis(4-methyl-6-tert.-butyl phenol) and an acid-accepting epoxy compound.

To afford further illustration, a series of ethyl cellulose hot melt compositions were formulated and tested to determine their color stability and extent of degradation after exposure to heat at 190° C. for differing prolonged periods of time under representative conditions that may ordinarily be encountered in hot dipping operations. The compositions are set forth in the following Table I, in which composition "E" is formulated in accordance with the invention. The results of the color stability test are represented in Table II. The color stability of each of the compositions was evaluated by casting them into 100 mil thick films after predetermined periods of thermal exposure and observing their color characteristics both by visual examination and by measurement of their ability to transmit light having a wave length of about 450 millimicrons. A Beckmann Model B spectrophotometer was used in the light transmission tests in which greater percentages of transmitted light indicate better film color and clarity. The extent of degradation was relatively determined by measurement of the tensile strengths and elongations of the films cast from the various compositions after the thermal exposures of the hot melt compositions. According to such tests, the results of which are given in Table III, decreases in the mentioned physical properties of the films are proportionately indicative of the degree of degradation that was undergone by the compositions from which the films were obtained during their residence at the 190° C. temperature. The elongation against thermal aging of each of the compositions is also graphically portrayed in the sole figure of the hereto-annexed drawing. In the graph, the practical limit of good pot life for a hot melt composition is indicated by a dotted line.

*Table I.—Hot melt compositions*

| Ingredient | Percent By Weight In Composition | | | | | | | |
|---|---|---|---|---|---|---|---|---|
| | "A" | "B" | "C" | "D" | "E" | "F" | "G" | "H" |
| Ethyl Cellulose [a] | 25 | 25 | 25 | 25 | 25 | 25 | 25 | 25 |
| "Mineral Oil 4695" [b] | 55 | 51.4 | 54.9 | 51.2 | 51 | 54.9 | 51.25 | 54.7 |
| "Dow Resin 276-V9" [c] | 18 | 16.8 | 17.92 | 16.75 | 16.7 | 17.92 | 16.7 | 17.9 |
| Paraffin Wax (M.P. 135° F.) | 2.00 | 1.80 | 1.93 | 1.80 | 1.80 | 1.93 | 1.8 | 1.9 |
| "Paraplex G-60" [d] | | 5.0 | | 5.0 | 5.0 | | 5.0 | |
| 2,2'-Methylene-bis-(4-methyl-6-tert.-butyl phenol) | | | 0.25 | 0.25 | 0.25 | | | 0.25 |
| Tricresyl Phosphite | | | | | 0.25 | 0.25 | 0.25 | 0.25 |

[a] "Standard" grade having an ethoxyl content in the range from 48.0–49.5 percent by weight and containing an average of 2.46–2.58 etherified ethyl substituents per glucose unit with a viscosity of about 50 centipoises as determined by conventional test in a solvent mixture consisting of toluene and ethanol in a 4:1 volume ratio, respectively, as obtained under the trademark "Ethocel, 50 cps., std."
[b] A white mineral oil having Saybolt viscosities at 100 and 210° F. of about 147.5 and 42.5 seconds, respectively; a viscosity index of about 83; a flash point of about 310° F.; a specific gravity at 60° F. compared to water at the same temperature of about 0.8845; an aniline point of about 214° F.
[c] A polymerized alpha-methyl styrene product having a viscosity of 700–1,000 centipoises at 60° C.
[d] An ester-type epoxidized soya bean oil plasticizer.

Table II.—Color characteristics of 100 mil films cast from hot melt compositions after various thermal exposures

| Films From Composition | Heating Period of Hot Melt at 190° C. in Hrs. | Percent Transmission by Film of 450 mμ Light | Visual Color Appearance of Film |
|---|---|---|---|
| "A" | 1 | 70 | Water White. |
|  | 4 | 53 | Light Amber. |
|  | 8 | 36 | Amber. |
| "B" | 1 | 70 | Water White. |
|  | 4 | 51 | Light Amber. |
|  | 8 | 36 | Amber. |
| "C" | 1 | 1 42 | Dark Amber.[1] |
|  | 4 | 12 | Brown. |
|  | 8 | 6 | Dark Brown. |
| "D" | 1 | 8 | Brown. |
|  | 24 | 4 | Dark Brown. |
| "E" | 1 | 79 | Water White. |
|  | 24 | 50 | Light Amber. |
| "F" | 1 | 73 | Water White. |
|  | 4 | 66 | Do. |
|  | 8 | 37 | Light Amber. |
| "G" | 1 | 71 | Water White. |
|  | 4 | 70 | Do. |
|  | 8 | 65 | Do. |
|  | 24 | 54 | Light Amber. |
| "H" | 1 | 79 | Water White. |
|  | 4 | 10 | Dark Amber. |

[1] Apparent discrepancy in data due to visual phenomena and use of light having narrow band of wave length in transmission test.

Table III.—Effect of degradation in physical properties of 100 mil films cast from hot melt compositions after various thermal exposures

| Films From Composition | "A" | | "B" | | "C" | | "D" | | "E" | | "F" | | "G" | | "H" | |
|---|---|---|---|---|---|---|---|---|---|---|---|---|---|---|---|---|
| Heating Period of Hot Melt at 190° C. In Hrs. | T (e) | S (f) | T | S | T | S | T | S | T | S | T | S | T | S | T | S |
| 1 | 485 | 41 | 500 | 58 | 508 | 73 | 575 | 76 | 625 | 76 | 370 | 70 | 370 | 81 | 325 | 57 |
| 4 | 455 | 35 | 405 | 48 | 494 | 71 | (h) | (h) | (h) | (h) | 320 | 30 | 350 | 78 | 100 | 3 |
| 8 | 460 | 16 | 375 | 31 | 500 | 72 | (h) | (h) | (h) | (h) | 250 | 8 | 320 | 74 | (g) | (g) |
| 24 | (g) | (g) | (g) | (g) | 560 | 73 | 765 | 85 | 725 | 75 | (g) | (g) | 220 | 23 | (g) | (g) |
| 88 | (g) | (g) | (g) | (g) | 730 | 71 | 750 | 70 | 742 | 70 | (g) | (g) | (g) | (g) | (g) | (g) |
| 112 | (g) | (g) | (g) | (g) | (h) | (h) | 630 | 38 | 720 | 64 | (g) | (g) | (g) | (g) | (g) | (g) |
| 134 | (g) | (g) | (g) | (g) | (h) | (h) | (g) | (g) | 680 | 52 | (g) | (g) | (g) | (g) | (g) | (g) |
| 168 | (g) | (g) | (g) | (g) | 790 | 24 | (g) | (g) | (g) | (g) | (g) | (g) | (g) | (g) | (g) | (g) |

NOTE.—(e) Indicates tensile strength of film in pounds per square inch. (f) Indicates per cent Elongation of Film. (g) Indicates that no sample was exposed for designated period. (h) Value not determined.

Practically the same results as above were noted when 2-ethylhexyl octylphenyl; tris-(2-chloroethyl); and tri-isooctyl phosphites were utilized in the same manner as the organic phosphate compounds and when a diglycidyl ether of a polyglycol from ethylene oxide; butyl epoxy stearate and hexyl epoxy stearate were employed as the acid-accepting epoxy ingredients. Commensurate outstandingly excellent results and literally dramatic benefits are provided when other stablized hot melt compositions in accordance with the invention are formulated with other of the indicated species of organic phosphite compounds and acid-accepting epoxy compounds.

Although the present invention has been primarily illustrated with 2,2′-methylene-bis-(4-methyl-6-tert.-butyl phenol), it is to be clearly understood that the invention is equally susceptible to being successfully practiced with the equivalent homologues of the indicated oxidation-inhibiting compound.

What is claimed is:

1. Ethyl cellulose hot melt composition that is stabilized with a minor proportion each of between about 0.005 and 5 weight percent, based on the weight of the composition, of (A) 2,2′-methylene-bis (4-methyl-6-tert.-butyl phenol); between about 0.1 and 10 weight percent, based on the weight of the composition, of (B) an acid-accepting epoxy compound; and between about 0.1 and 2 weight percent, based on the weight of the composition, of (C) a neutral organic phosphite compound that is selected from the group consisting of alkyl phosphites, halogen substituted alkyl phosphites, aryl phosphites, halogen substituted aryl phosphites, mixed alkyl-aryl phosphites, mixed halogen substituting alkyl-aryl phosphites and mixtures thereof.

2. The composition of claim 1, containing between about 0.05 and 4.0 percent by weight of the 2,2′-methylene-bis(4-methyl-6-tert.-butyl phenol); between about 2.0 and 8.0 percent by weight of the acid-accepting epoxy compound; and between about 0.1 and 0.5 percent by weight of the neutral organic phosphite compound, each based on the weight of the composition.

3. A composition that is in accordance with the composition set forth in claim 2, wherein the proportions by weight of each of said stabilizing ingredients are in the ratio of about 0.4–4:10–30:1, in the respective recited order.

4. A composition in accordance with the composition set forth in claim 3, wherein the combined total of said stabilizing ingredients is between about 4 and 7 percent by weight of the composition.

5. The composition of claim 1, wherein the neutral organic phosphite compound is an alkyl phosphite in which the alkyl groups independently contain from 2 to 10 carbon atoms in their structures.

6. The composition of claim 1, wherein the neutral organic phosphite compound is an aryl phosphite in which the aryl groups independently contain from 6 to 16 carbon atoms in their structures.

7. The composition of claim 1, wherein the neutral organic phosphite compound is an alkyl-aryl phosphite in which each alkyl group and each aryl group independently contains from 2 to 10 and from 6 to 16 carbon atoms, respectively, in its structure.

8. The composition of claim 1, wherein the neutral organic phosphite compound is tricresyl phosphite.

9. The composition of claim 1 wherein the neutral organic phosphite compound is 2-ethylhexyl octylphenyl phosphite.

10. The composition of claim 1, wherein the neutral organic phosphite compound is tri-(2-chloroethyl) phosphite.

11. The composition of claim 1, wherein the neutral organic phosphite compound is triisooctyl phosphite.

12. The composition of claim 1, wherein the neutral organic phosphite compound is tris-(2-ethylhexyl) phosphite.

13. The composition of claim 1 wherein the acid-accepting epoxy compound is a diglycidyl ether of a polyglycol.

14. The composition of claim 1, wherein the acid-accepting epoxy compound is a diglycidyl ether of bisphenol A.

15. The composition of claim 1, wherein the acid-accepting epoxy compound is an epoxidized unsaturated fatty acid ester.

16. A composition according to the composition set forth in claim 15, wherein the acid-accepting epoxy compound is octyl epoxy stearate.

17. A composition according to the composition set forth in claim 15, wherein the acid-accepting epoxy compound is butyl epoxy stearate.

18. The composition of claim 1, wherein the acid-accepting epoxy compound is an epoxidized natural glyceride of unsaturated fatty acids, which fatty acids contain from 12 to 22 carbon atoms in their structures.

19. A composition according to the composition set forth in claim 18, wherein the acid-accepting epoxy compound is epoxidized soya bean oil.

References Cited in the file of this patent

UNITED STATES PATENTS

| | | |
|---|---|---|
| 2,294,211 | Rothrock | Aug. 25, 1942 |
| 2,299,096 | Krieger | Oct. 20, 1942 |
| 2,321,620 | Pratt | June 15, 1943 |
| 2,333,577 | Koch | Nov. 2, 1943 |
| 2,425,351 | Sharphouse et al. | Aug. 12, 1947 |
| 2,541,252 | Horback | Feb. 3, 1951 |
| 2,570,402 | Stevens et al. | Oct. 9, 1951 |
| 2,633,458 | Shokal | Mar. 31, 1953 |
| 2,651,572 | Bickoff | Sept. 8, 1953 |
| 2,710,844 | Thompson | June 14, 1955 |
| 2,732,367 | Shokal | Jan. 24, 1956 |
| 2,739,161 | Carlson | Mar. 20, 1956 |
| 2,754,285 | Petropoulos | July 10, 1956 |